(12) United States Patent
Chiu et al.

(10) Patent No.: US 9,152,316 B2
(45) Date of Patent: Oct. 6, 2015

(54) ELECTRONIC DEVICE, CONTROLLING METHOD THEREOF, AND NON-TRANSITORY STORAGE MEDIUM

(71) Applicant: HTC Corporation, Taoyuan County (TW)

(72) Inventors: Kai-Feng Chiu, Taoyuan County (TW); Yu-Jhang Lu, Taoyuan County (TW); Shih-Yun Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 128 days.

(21) Appl. No.: 13/831,978

(22) Filed: Mar. 15, 2013

(65) Prior Publication Data

US 2014/0240244 A1 Aug. 28, 2014

(30) Foreign Application Priority Data

Feb. 27, 2013 (CN) .......................... 2013 1 0062541

(51) Int. Cl.
*G06F 3/041* (2006.01)
*G06F 3/0488* (2013.01)
*G06F 3/01* (2006.01)

(52) U.S. Cl.
CPC .............. *G06F 3/0488* (2013.01); *G06F 3/017* (2013.01); *G06F 3/041* (2013.01)

(58) Field of Classification Search
USPC ................................................ 715/700–867
See application file for complete search history.

(56) References Cited

U.S. PATENT DOCUMENTS

| 2007/0150842 | A1* | 6/2007 | Chaudhri et al. | 715/863 |
| 2009/0228820 | A1* | 9/2009 | Kim et al. | 715/769 |
| 2009/0249247 | A1* | 10/2009 | Tseng et al. | 715/808 |
| 2012/0117507 | A1* | 5/2012 | Tseng et al. | 715/774 |
| 2013/0152018 | A1* | 6/2013 | Chuang et al. | 715/823 |

FOREIGN PATENT DOCUMENTS

| CN | 102609178 | 7/2012 |
| TW | 201145128 | 12/2011 |

OTHER PUBLICATIONS

"Office Action of Taiwan Counterpart Application", issued on Feb. 25, 2015, p. 1-p. 9.

* cited by examiner

*Primary Examiner* — Kumar Patel
*Assistant Examiner* — Amy C Onyekaba
(74) *Attorney, Agent, or Firm* — Jianq Chyun IP Office (57) ABSTRACT

An electronic device, a controlling method thereof, and a non-transitory storage medium are provided. The method includes displaying a first user interface of a first mode in a first area of a touch screen of the electronic device and one or more snapshots of a second user interface of a second mode in a second area of the touch screen while the electronic device is in the first mode. The method also includes detecting a first sliding gesture on or near the touch screen. The method further includes switching the electronic device from the first mode into the second mode if the first sliding gesture complies with a predetermined switching condition.

17 Claims, 5 Drawing Sheets

ELECTRONIC DEVICE, CONTROLLING METHOD THEREOF, AND NON-TRANSITORY STORAGE MEDIUM

CROSS-REFERENCE TO RELATED APPLICATION

This application claims the priority benefit of China application serial no. 201310062541.2, filed on Feb. 27, 2013. The entirety of the above-mentioned patent application is hereby incorporated by reference herein and made a part of this specification.

BACKGROUND

1. Field of the Invention

The invention relates to a controlling method, and more particularly, to a controlling method of an electronic device, an electronic device using the method, and a non-transitory storage medium.

2. Description of Related Art

As mobile communication becomes more and more advanced, mobile electronic devices have become indispensable tools in people's life nowadays. When manufactures develop products, they not only focus on the improvement in the performance of the hardware components but also focus more on the design of software. The quality of the user interface designs directly influences the users' perception and feelings about operation, and therefore it is an important indicator in the users' assessment on the products.

The mobile electronic devices nowadays allow the users to download and install applications and widgets by themselves, wherein the applications are displayed by application shortcuts on the desktop, and the widgets on the desktop display an image that may receive the users' operations and present more information. Not only do the applications and the widgets have different functions and ways of operation, the two are also presented in different ways on the desktop. The users have to memorize by heart how to operate various widgets and applications. For the users that use the electronic devices for the first time or are still unfamiliar with the operation, it may be difficult to learn the operation method quickly and thus causes inconvenience.

SUMMARY OF THE INVENTION

The invention provides an electronic device and a controlling method thereof and a non-transitory storage medium, so that a user may learn how to operate the electronic device more quickly.

The controlling method of the electronic device of the invention is suitable for an electronic device with a touch screen. The method includes displaying a first user interface of a first mode in a first area of the touch screen and one or more snapshots of a second user interface of a second mode in a second area of the touch screen while the electronic device is in the first mode. The method also includes detecting a first sliding gesture on or near the touch screen. The method further includes switching the electronic device from the first mode into the second mode if the first sliding gesture complies with a predetermined switching condition.

From another aspect, an electronic device of the invention includes a touch screen, a memory, at least one processor and at least one procedure. The procedure is stored in the memory and is configured to be performed by the processor, wherein the procedure includes instructions to perform the following operations: displaying a first user interface of a first mode in a first area of the touch screen and one or more snapshots of a second user interface of a second mode in a second area of the touch screen while the electronic device is in the first mode; detecting a first sliding gesture on or near the touch screen; and switching the electronic device from the first mode into the second mode if the first sliding gesture complies with a predetermined switching condition.

From still another aspect, a non-transitory storage medium of the invention stores at least one program instruction which, after loaded into an electronic device with a touch screen, is configured to perform the following steps. First, while the electronic device is in the first mode, a first user interface of a first mode is displayed in a first area of the touch screen, and one or more snapshots of a second user interface of a second mode are displayed in a second area of the touch screen. Then, a first sliding gesture on or near the touch screen is detected. And if the first sliding gesture complies with a predetermined switching condition, the electronic device is switched from the first mode into the second mode.

Based on the above, in the invention, when the electronic device is in the first mode, the electronic device displays not only the user interface in this mode but also the snapshots of the user interface in the second mode, so as to prompt the user that there is another mode available. In this way, the user may be familiar with the operation of the electronic device more quickly, and the convenience of use is improved.

To make the above features and advantages of the present invention more comprehensible, several embodiments accompanied with drawings are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF EMBODIMENTS

Figure 1:
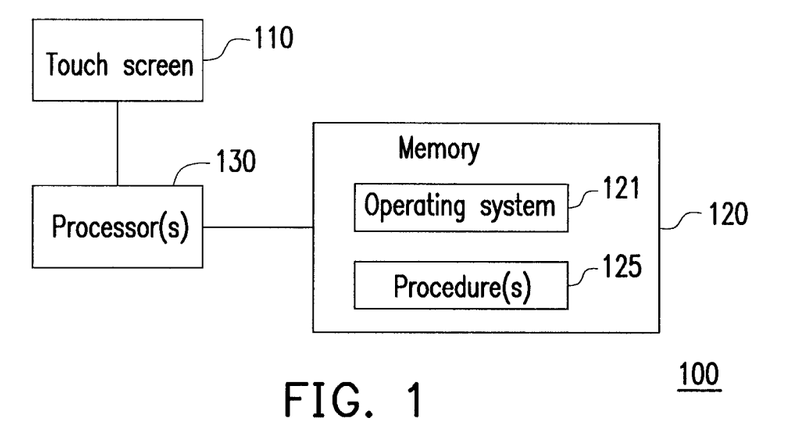
FIG. 1 is a schematic view of an electronic device according to an embodiment of the invention.

FIG. 1 is a block diagram of an electronic device according to an embodiment of the invention. Referring to FIG. 1, an electronic device 100 includes a touch screen 110, a memory 120 and one or more processors 130. The electronic device 100 is, for example, a mobile phone, a smart phone, a personal digital assistant (PDA), a laptop, a tablet computer or a digital camera, but the invention is not limited thereto.

The touch screen 110 may be a resistive touch screen, a capacitive touch screen, an optical touch screen or an electromagnetic touch screen, and the invention is not limited thereto. The touch screen 110 is an input and output interface of the electronic device 100, so that the touch screen 110 displays different visual outputs when a user operates the electronic device 100 and receives touch controls from the user. The visual outputs may be graphical user interfaces of the electronic device 100 in different modes.

The memory 120 may be a storage device built in the electronic device 100, such as a random access memory or a non-volatile memory, like a flash memory or a disk. The memory 120 may also be an external storage device, such as a secure digital (SD) card, a subscriber identity module (SIM) card or other storage media that may be connected to the electronic device 100 from external. The memory 120 may also be a network storage space accessed by a network element (not shown) of the electronic device 100 through a communication network.

In the present embodiment, at least one operating system 121 and one or more procedures 125 are stored in the memory 120.

The operating system 121 includes various software and/or driver programs to manage general operations of the electronic device 100. For example, the operating system 121 provides the user with an interface to allow the user to interact with the electronic device 100 and to manage applications currently running on the electronic device 100 and to manage files stored in the electronic device 100.

The one or more procedures 125 include a plurality of instructions performed by the one or more processors 130. Specifically, the one or more processors 130 perform the one or more procedures 125, so that a controlling method of the electronic device 100 of the present embodiment may be implemented. The detailed process of the controlling method is explained below with reference to drawings.

The one or more processors 130 may be central processing units (CPU) configured to perform various software and/or instruction sets stored in the memory 120 so as to perform different functions of the electronic device 100 and to process data after the power of the electronic device 100 is on.

Figure 2:
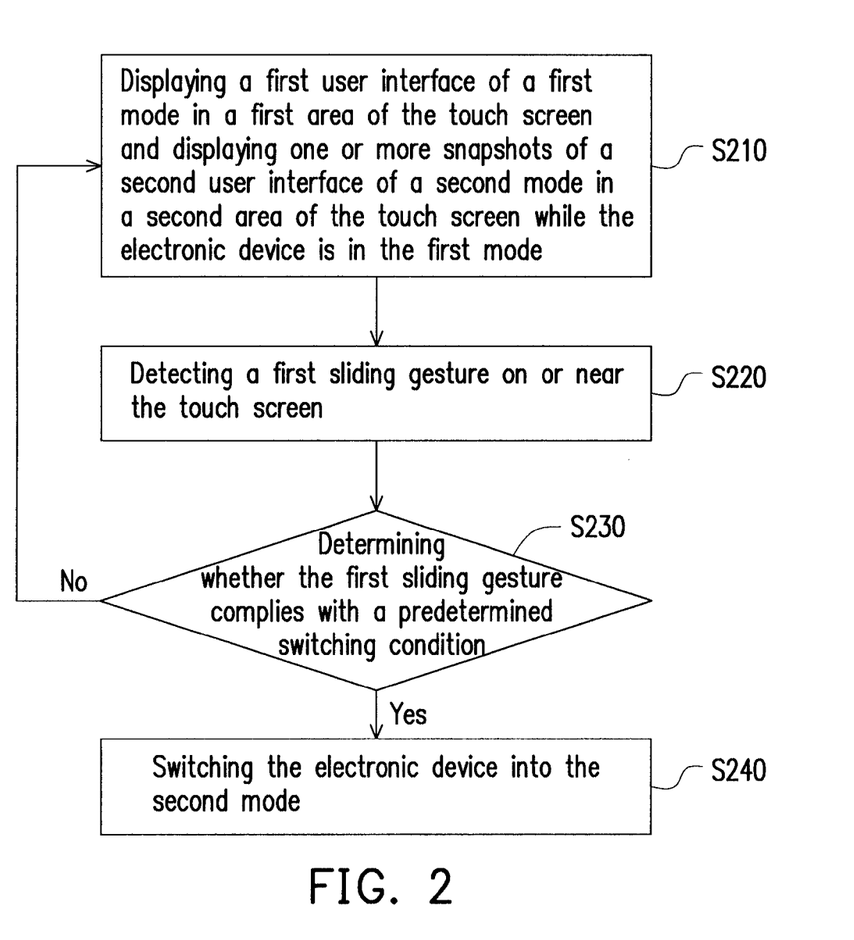
FIG. 2 is a flowchart of a controlling method of an electronic device according to an embodiment of the invention.

The controlling method of the electronic device 100 is illustrated in detail according to another embodiment of the invention. FIG. 2 is a flowchart of a controlling method of an electronic device according to an embodiment of the invention. Please refer to FIGS. 1 and 2.

In the present embodiment, the electronic device 100 has at least a first mode and a second mode. According to the current mode of the electronic device 100, the user may perform corresponding operations on the electronic device 100. The first mode and the second mode are two of an all-application mode, a widget mode, and a recently-used-application mode. A user interface of the all-application mode displays application shortcuts corresponding to all the applications installed in the electronic device 100. If the number of all the applications installed in the electronic device 100 is greater than a first predetermined number, then the user interface of the all-application mode includes a plurality of pages, and the number of the application shortcuts displayed in each of the pages is the first predetermined number at most. A user interface of the widget mode displays one or more widgets predetermined within the system and/or chosen by the user. If the number of the widgets predetermined within the system and/or chosen by the user is greater than a second predetermined number, then the user interface of the widget mode includes a plurality of pages, and the number of the widgets displayed in each of the pages is the second predetermined number at most. A user interface of the recently-used-application mode displays application shortcuts corresponding to the applications opened by the user within a predetermined period of time. If the number of the applications opened within a predetermined period of time is greater than a third predetermined number, then the user interface of the recently-used-application mode includes a plurality of pages, and the number of the application shortcuts displayed in each of the pages is the third predetermined number at most.

Figure 3:
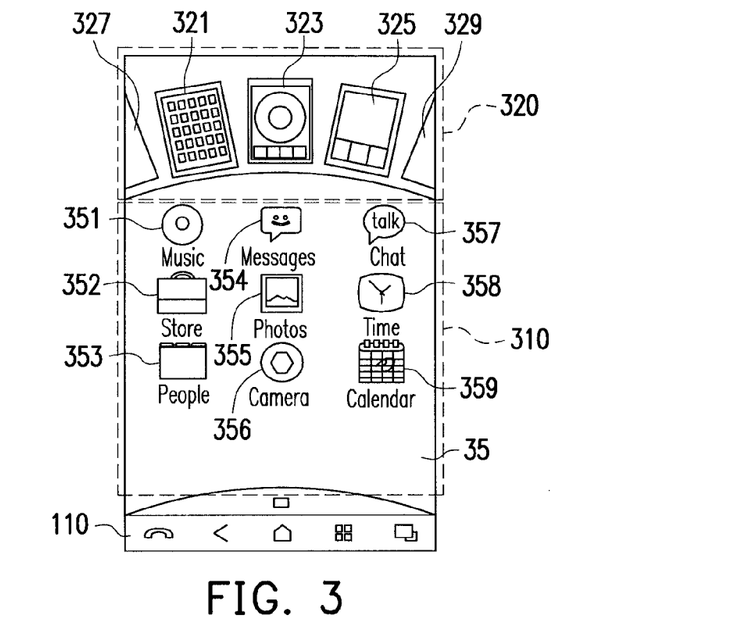
FIGS. 3, 4 and 6A-6C are schematic views of an electronic device in a first mode according to an embodiment of the invention.

First, as shown in Step S210, while the electronic device 100 is in the first mode, a user interface of the first mode is displayed in a first area of the touch screen 110, and one or more snapshots of a user interface of the second mode are displayed in a second area of the touch screen 110. To facilitate the illustration, hereinafter, the user interface of the first mode is referred to as a first user interface, and the user interface of the second mode is referred to as a second user interface. For example, a size relationship between the first area and the second area reflects the current mode of the electronic device 100. Therefore, in the present embodiment, the second area is smaller than the first area to reflect that the electronic device 100 is currently in the first mode to which the larger first area corresponds. It is assumed that the first mode is the all-application mode and that the second mode is the widget mode. As shown in FIG. 3, a first area 310 of the touch screen 110 displays a page of a first user interface 35 of the all-application mode, and the page includes 9 application shortcuts 351 to 359. If there are other applications installed in the electronic device 100 in addition to the 9 applications to which the application shortcuts 351 to 359 correspond, then the first user interface further includes one or more other pages. The user may perform a certain operation (such as a sliding gesture to the left or to the right, but the invention is not limited thereto) in the first area 310 of the touch screen 110 so as to display other pages included by the first user interface 35 in the first area 310. The user may also click on any application shortcut displayed in the first area 310 to launch the corresponding application. A second area 320 of the touch screen 110 displays several snapshots 321, 323, 325, 327 and 329 of the second user interface of the widget mode. It should be noted that when the electronic device 100 is in the first mode, the user is not able to perform operations in the second mode through the snapshots 321, 323, 325, 327 and 329 of the second user interface. That is, when the electronic device 100 is still in the first mode, the user is not able to use functions of the widgets by performing operations on the snapshots 321, 323, 325, 327 and 329 in the second area.

Then, in Step S220, a first sliding gesture on or near the touch screen 110 is detected. For example, the first sliding gesture may be a movement on or near the touch screen 110 made by the user with fingers or other input tools.

Figure 4:
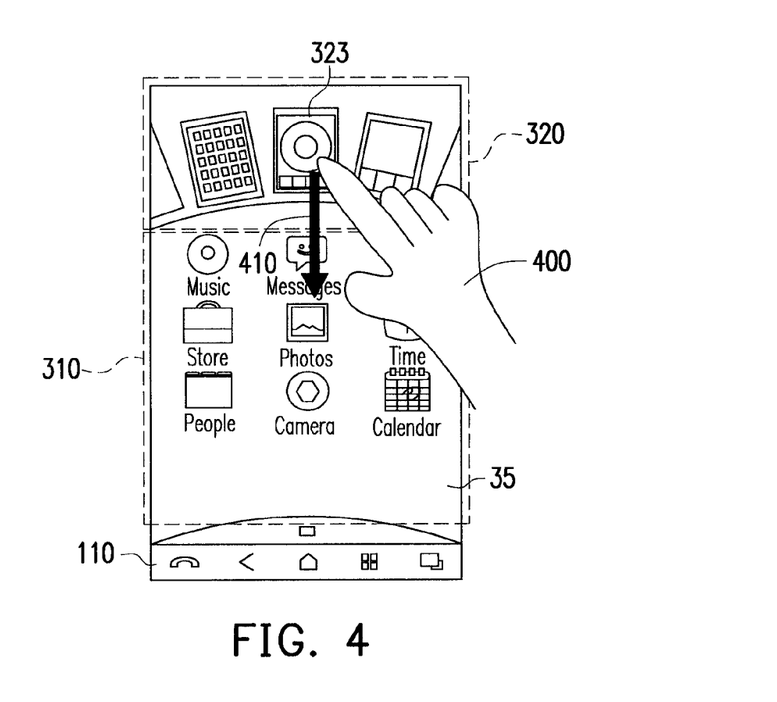

In addition, as shown in Step S230, it is determined if the detected first sliding gesture complies with a predetermined switching condition. In the present embodiment, the first sliding gesture that complies with the predetermined switching condition is a sliding gesture substantially moving from the second area toward the direction of the first area. For example, as shown in FIG. 4, it is assumed that the first area 310 of the touch screen 110 is located under the second area 320. Then, the first sliding gesture that complies with the predetermined switching condition is, for example, a sliding gesture from the second area 320 toward the direction of the first area 310 made by the user with a hand 400 (or other input tools) on or near the touch screen 110. As shown by an arrow 410, the first sliding gesture is in a roughly downward direction. In an embodiment, to determine whether the first sliding gesture complies with the predetermined switching condition further includes determining whether the first sliding gesture starts from the second area 320. However, in another embodiment, the predetermined switching condition does not limit an initial position of the operation. It should be noted that a relative position of the first area 310 and the second area 320 is designed to prompt the user to switch the mode (i.e. to switch from the first mode to the second mode) of the electronic device 100 by sliding from up to down. In other embodiments, if the first area is located above the second area, then the first sliding gesture that complies with the predetermined switching condition is substantially a sliding gesture moving upward.

Figure 5:
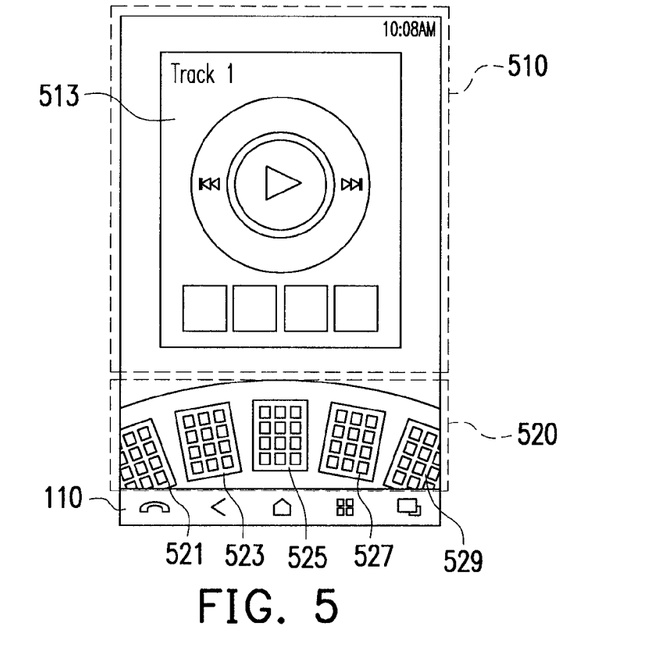
FIG. 5 is a schematic view of an electronic device in a second mode according to an embodiment of the invention.

If the first sliding gesture does not comply with the predetermined switching condition, the present embodiment returns to Step S210. When the first sliding gesture complies with the predetermined switching condition, then as shown in Step S240, the electronic device 100 is switched to the second mode. In addition, after the electronic device 100 is switched to the second mode, what the touch screen 110 displays also changes. In detail, in the second mode, a third area of the touch screen 110 displays the second user interface of the second mode, and a fourth area of the touch screen 110 displays one or more snapshots of the first user interface of the first mode. The fourth area is smaller than the third area to reflect that the electronic device 100 has been switched to the second mode. In other words, as the electronic device 100 is switched from the first mode to the second mode, a display area of the first user interface on the touch screen 110 turns from large to small, while a display area of the second user interface on the touch screen 110 turns from small to large. The following is a continuation from the above embodiment. Referring to FIG. 4, when the electronic device 100 is in the all-application mode, the snapshot 323 of the second user interface is displayed in a central position of the second area 320 of the touch screen 110. Based on this, after the electronic device 100 is switched from the all-application mode to the widget mode, as shown in FIG. 5, what is displayed in a third area 510 of the touch screen 110 is a first page 513 of the second user interface, wherein the first page 513 corresponds to the snapshot 323. A fourth area 520 of the touch screen 110 displays one or more snapshots (such as snapshots 521, 523, 525, 527 and 529) of the first user interface. When the electronic device 100 is in the second mode, the user is not able to perform operations in the first mode through any of the snapshots in the fourth area 520. That is, when the electronic device 100 is still in the second mode, the user is not able to activate applications by clicking on the application shortcuts in the snapshots 521, 523, 525, 527 and 529.

In an embodiment, while the electronic device 100 is still in the first mode, a snapshot displayed in the second area includes a first snapshot of a first page of the second user interface and a second snapshot of a second page of the second user interface. It is assumed that when viewed from the horizontal direction, the first snapshot is located in a central position of the second area of the touch screen 110. When the electronic device 100 is in the first mode, the user may perform a sliding gesture (such as a sliding gesture to the left or to the right) to move the first snapshot or the second snapshot to the central position of the second area of the touch screen 110 by turns. If the second snapshot is moved to the central position of the second area of the touch screen 110, and later the first sliding gesture that complies with the predetermined switching condition is detected, then the second page of the second user interface to which the second snapshot corresponds is displayed on the touch screen 110 after the electronic device 100 is switched from the first mode to the second mode. In other words, the page to which the snapshot displayed in the central position of the second area corresponds is displayed on the touch screen 110 after the electronic device 100 is switched from the first mode to the second mode. Take FIG. 3 as an example. It is assumed that when the electronic device 100 is in the all-application mode, the user moves the snapshot 321 to the central position of the second area 320 through a second sliding gesture and later performs the first sliding gesture that complies with the predetermined switching condition, then the page of the second user interface to which the snapshot 321 corresponds is displayed on the third area of the touch screen 110 after the electronic device 100 is switched to the widget mode.

In another embodiment of the invention, it is assumed that the first mode is the all-application mode and that the second mode is the widget mode. When the electronic device 100 is in the all-application mode, the first user interface displayed in the first area includes one or more application shortcuts. If a user input being on or near the touch screen 110 and applied to a certain application shortcut is detected, then the electronic device 100 moves the application shortcut to the second area according to the user input and adds a widget corresponding to the application shortcut in the second user interface.

Figure 6A:
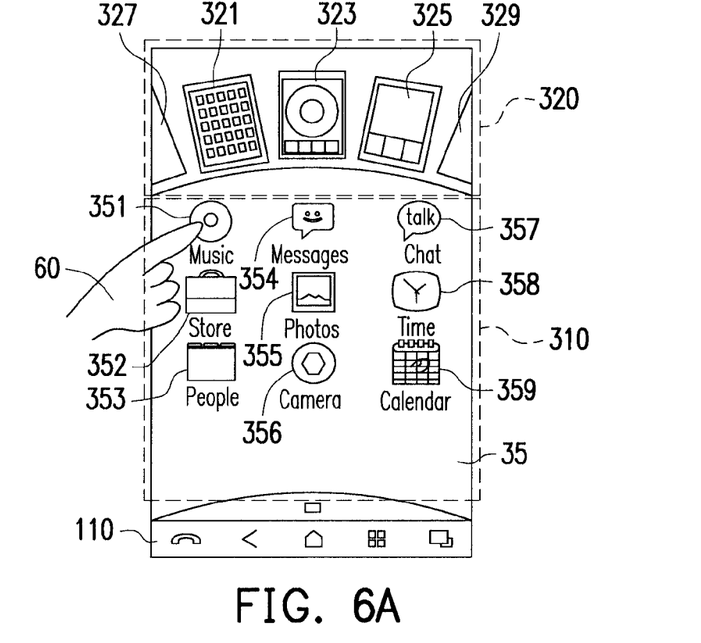
Figure 6B:
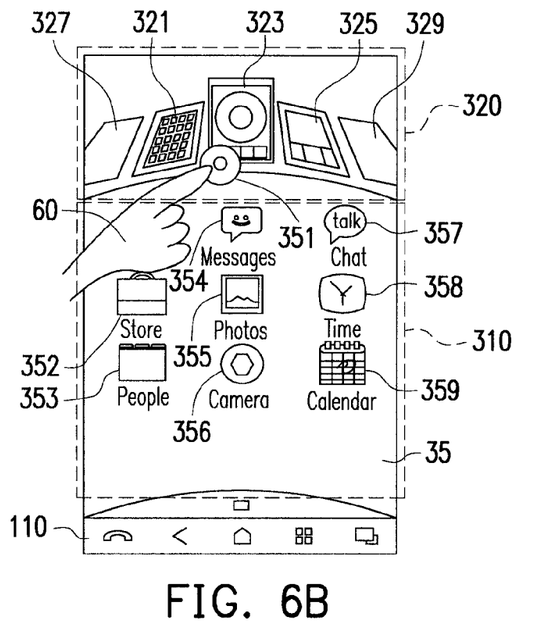
Figure 6C:
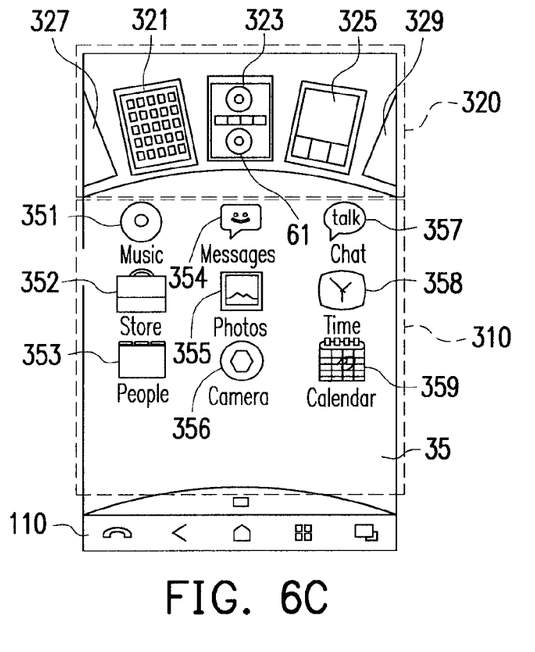

In still another embodiment, it is assumed that the first mode is the all-application mode and that the second mode is the widget mode. When the electronic device 100 is in the all-application mode, the first user interface displayed in the first area includes one or more application shortcuts, and snapshots displayed in the second area snapshots of each of the pages of the second user interface. As shown in FIG. 6A, assuming that the electronic device 100 detects a user input being on or near the touch screen 110 and applied to an application shortcut 351 by a hand 60, wherein the user input is, for example, an upward drag operation ending in a sub-area corresponding to the snapshot 323 in the second area 320. Then, as shown in FIG. 6B, the electronic device 100 moves the application shortcut 351 to the sub-area corresponding to the snapshot 323 according to the user input movement. When the application shortcut 351 is moved to the sub-area corresponding to the snapshot 323, the electronic device 100 displays the snapshot 323 at a first angle (e.g., the snapshot 323 is displayed upright) and displays other snapshots 321, 325, 327 and 329 at a second angle (e.g., the snapshots 321, 325, 327 and 329 are displayed lying down), wherein the first angle is different from the second angle. In this way, the user is able to determine which snapshot is being edited right now. In one embodiment, a substitute for the application shortcut 351 is being displayed on the first area 310 while the user input still exists. After the user input is completed, as shown in FIG. 6C, the electronic device 100 adds a widget 61 corresponding to the application shortcut 351 in the second user interface. To be specific, the widget 61 corresponding to the application shortcut 351 is added to the snapshot 323 while the application shortcut 351 is still displayed on the first user interface 35.

Figure 7:
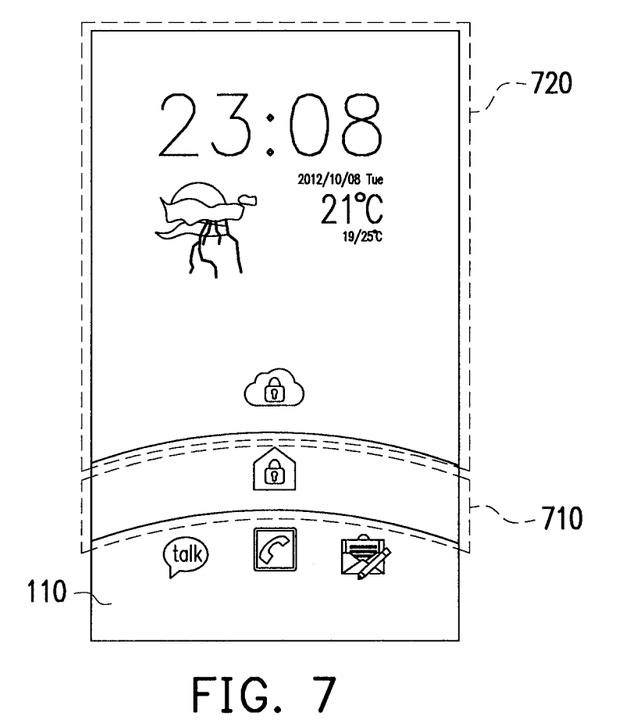
FIG. 7 is a schematic view of an electronic device in a user-interface lock state according to an embodiment of the invention.

As shown in FIG. 7, in the present embodiment, when the electronic device 100 is in a user-interface lock state, the touch screen 110 includes a first touch area 710 and a second touch area 720, wherein the first touch area 710 corresponds to the first mode, and the second touch area 720 corresponds to the second mode. When the electronic device 100 detects an unlock operation on or near the touch screen 110, the electronic device 100 is switched from the user-interface lock state to the first mode when the unlock operation complies with a first predetermined unlock condition, wherein the first predetermined unlock condition includes determining whether the unlock operation starts from the first touch area. The electronic device 100 is switched from the user-interface lock state to the second mode when the unlock operation complies with a second predetermined unlock condition, wherein the second predetermined unlock condition includes determining whether the unlock operation starts from the second touch area. Based on this, the user may decide the mode the electronic device 100 enters after unlocked through different unlock operations.

The invention further provides a non-transitory storage medium. The non-transitory storage medium records a plurality of program instructions. The program instructions, after loaded in the electronic device and executed, may accomplish steps of the aforementioned method for providing a screen locked background and thus allows the electronic device to achieve the functions illustrated in the above embodiments. The non-transitory storage medium may be a read only memory, a random access memory, a magnetic tape, a floppy disk, a hard disk, an optical disk, transmission medium, etc. In other embodiments, the computer program products may also be directly provided via a network transmission, and the scope thereof is not limited herein.

In summary of the above, in the electronic device and the controlling method thereof and the non-transitory storage medium of the invention, when the electronic device is in the first mode, the electronic device may display the user interface in the first mode and the snapshots of the user interface in the second mode, so as to prompt the user that there is another mode available and to provide an operation way convenient for switching the modes. In this way, the user may operate the electronic device with intuitively, and the convenience of use is improved.

Although the invention has been disclosed by the above embodiments, they are not intended to limit the invention. It will be apparent to those of ordinary skill in the art that modifications and variations to the invention may be made without departing from the spirit and the scope of the invention. Accordingly, the protection scope of the invention falls in the appended claims.

What is claimed is:

1. A controlling method of an electronic device, wherein the electronic device has a touch screen, the controlling method comprising:
    displaying a first user interface of a first mode in a first area of the touch screen and displaying one or more snapshots of a second user interface of a second mode in a second area of the touch screen while the electronic device is in the first mode;
    detecting a first sliding gesture on or near the touch screen;
    switching the electronic device from the first mode into the second mode when the first sliding gesture complies with a predetermined switching condition; and
    displaying the second user interface of the second mode in a third area of the touch screen and displaying one or more snapshots of the first user interface of the first mode in a fourth area of the touch screen after the electronic device is switched to the second mode, wherein the fourth area is smaller than the third area, and wherein the second user interface displayed in the third area corresponds to the snapshot displayed at a central position of the second area while the electronic device is in the first mode.

2. The controlling method of claim 1, wherein the first sliding gesture complies with the predetermined switching condition is a sliding gesture that substantially moves from the second area to the first area.

3. The controlling method of claim 1, wherein the second area is smaller than the first area.

4. The controlling method of claim 1, wherein the one or more snapshots comprise a first snapshot of a first page of the second user interface and a second snapshot of a second page of the second user interface, wherein the first snapshot is located in the central position of the second area of the touch screen, the controlling method further comprising:
    moving the second snapshot to the central position of the second area of the touch screen in response to a detected second sliding gesture being on or near the touch screen and applied to the one or more snapshots; and
    displaying the second page of the second user interface corresponding to the second snapshot on the touch screen after the electronic device is switched to the second mode.

5. The controlling method of claim 1, wherein the first mode and the second mode are two of an all-application mode, a widget mode, and a recently-used-application mode.

6. The controlling method of claim 1, wherein the first mode is an all-application mode, the first user interface comprises an application shortcut, and the second mode is a widget mode, the controlling method further comprising:
    detecting a user input being on or near the touch screen and applied to the application shortcut;
    moving the application shortcut to the second area according to the user input; and
    adding a widget corresponding to the application shortcut on the second user interface.

7. The controlling method of claim 1, wherein the first mode is an all-application mode, the first user interface comprises an application shortcut, the second mode is a widget mode, and the one or more snapshots comprise a first snapshot of a first page of the second user interface and a second snapshot of a second page of the second user interface, the controlling method further comprising:
    detecting a user input being on or near the touch screen and applied to the application shortcut;
    moving the application shortcut to a sub-area corresponding to the first snapshot in the second area according to the user input; and
    adding a widget corresponding to the application shortcut on the first page of the second user interface,
    wherein when the application shortcut is moved to the sub-area corresponding to the first snapshot in the second area, the first snapshot is displayed at a first angle, and the second snapshot is displayed at a second angle, wherein the first angle is different from the second angle.

8. The controlling method of claim 1, further comprising:
    the touch screen comprising a first touch area and a second touch area when the electronic device is in a user-interface lock state, wherein the first touch area corresponds to the first mode, and the second touch area corresponds to the second mode;
    detecting an unlock operation on or near the touch screen;
    switching the electronic device to the first mode when the unlock operation complies with a first predetermined unlock condition, wherein the first predetermined unlock condition comprises determining whether the unlock operation starts from the first touch area; and
    switching the electronic device to the second mode when the unlock operation complies with a second predetermined unlock condition, wherein the second predetermined unlock condition comprises determining whether the unlock operation starts from the second touch area.

9. An electronic device, comprising:
    a touch screen;
    a memory;
    at least one processor; and
    at least one procedure, wherein the at least one procedure is stored in the memory and is configured to be performed by the at least one processor, and the at least one procedure comprises instructions to perform the following operations:

displaying a first user interface of a first mode in a first area of the touch screen and displaying one or more snapshots of a second user interface of a second mode in a second area of the touch screen while the electronic device is in the first mode;

detecting a first sliding gesture on or near the touch screen;

switching the electronic device from the first mode into the second mode when the first sliding gesture complies with a predetermined switching condition; and displaying the second user interface of the second mode in a third area of the touch screen and displaying one or more snapshots of the first user interface of the first mode in a fourth area of the touch screen after the electronic device is switched to the second mode, wherein the fourth area is smaller than the third area, and wherein the second user interface corresponds to the snapshot displayed at a central position of the second area while the electronic device is in the first mode.

10. The electronic device according to claim 9, wherein the first sliding gesture complies with the predetermined switching condition is a sliding gesture that substantially moves from the second area to the first area.

11. The electronic device according to claim 9, wherein the second area is smaller than the first area.

12. The electronic device according to claim 9, wherein the one or more snapshots comprise a first snapshot of a first page of the second user interface and a second snapshot of a second page of the second user interface, wherein the first snapshot is located at the central position of the second area of the touch screen, and the at least one procedure further comprises instructions to perform the following operations:

moving the second snapshot to the central position of the touch screen in response to a detected second sliding gesture being on or near the touch screen and applied to the one or more snapshots; and displaying the second page of the second user interface corresponding to the second snapshot on the touch screen after the electronic device is switched to the second mode.

13. The electronic device according to claim 9, wherein the first mode and the second mode are two of an all-application mode, a widget mode, and a recently-used-application mode.

14. The electronic device according to claim 9, wherein the first mode is an all-application mode, the first user interface comprises an application shortcut, the second mode is a widget mode, and the at least one procedure further comprises instructions to perform the following operations:

detecting a user input being on or near the touch screen and applied to the application shortcut;

moving the application shortcut to the second area according to the user input; and adding a widget corresponding to the application shortcut on the second user interface.

15. The electronic device according to claim 9, wherein the first mode is an all-application mode, the first user interface comprises an application shortcut, the second mode is a widget mode, the one or more snapshots comprise a first snapshot of a first page of the second user interface and a second snapshot of a second page of the second user interface, and the at least one procedure further comprises instructions to perform the following operations:

detecting a user input being on or near the touch screen and applied to the application shortcut;

moving the application shortcut to a sub-area corresponding to the first snapshot in the second area according to the user input; and adding a widget corresponding to the application shortcut on the first page of the second user interface, wherein when the application shortcut is moved to the sub-area corresponding to the first snapshot in the second area, the first snapshot is displayed at a first angle, and the second snapshot is displayed at a second angle, wherein the first angle is different from the second angle.

16. The electronic device according to claim 9, wherein the at least one procedure further comprises instructions to perform the following operations:

the touch screen comprising a first touch area and a second touch area when the electronic device is in a user-interface lock state, wherein the first touch area corresponds to the first mode, and the second touch area corresponds to the second mode;

detecting an unlock operation on or near the touch screen;

switching the electronic device to the first mode when the unlock operation complies with a first predetermined unlock condition, wherein the first predetermined unlock condition comprises determining whether the unlock operation starts from the first touch area; and switching the electronic device to the second mode when the unlock operation complies with a second predetermined unlock condition, wherein the second predetermined unlock condition comprises determining whether the unlock operation starts from the second touch area.

17. A non-transitory storage medium storing at least one program instruction which, after loaded into an electronic device with a touch screen, is configured to perform the following steps:

displaying a first user interface of a first mode in a first area of the touch screen and displaying one or more snapshots of a second user interface of a second mode in a second area of the touch screen while the electronic device is in the first mode;

detecting a first sliding gesture on or near the touch screen;

switching the electronic device from the first mode into the second mode when the first sliding gesture complies with a predetermined switching condition; and displaying the second user interface of the second mode in a third area of the touch screen and displaying one or more snapshots of the first user interface of the first mode in a fourth area of the touch screen after the electronic device is switched to the second mode, wherein the fourth area is smaller than the third area, and wherein the second user interface corresponds to the snapshot displayed at a central position of the second area while the electronic device is in the first mode.

* * * * *